United States Patent
Endo

(10) Patent No.: US 9,013,563 B2
(45) Date of Patent: Apr. 21, 2015

(54) WAVELENGTH SEPARATION DEVICE, PROJECTOR, AND IMAGE DISPLAY SYSTEM

(71) Applicant: Seiko Epson Corporation, Tokyo (JP)

(72) Inventor: Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 295 days.

(21) Appl. No.: 13/790,888

(22) Filed: Mar. 8, 2013

(65) Prior Publication Data

US 2013/0242066 A1 Sep. 19, 2013

(30) Foreign Application Priority Data

Mar. 14, 2012 (JP) ................. 2012-057234

(51) Int. Cl.
| | |
|---|---|
| *H04N 13/00* | (2006.01) |
| *G02B 27/26* | (2006.01) |
| *H04N 13/04* | (2006.01) |
| *G02B 27/22* | (2006.01) |
| *G02B 27/28* | (2006.01) |

(52) U.S. Cl.
CPC ............ *G02B 27/26* (2013.01); *H04N 13/0434* (2013.01); *G02B 27/2207* (2013.01); *G02B 27/288* (2013.01); *H04N 13/0431* (2013.01); *H04N 13/0438* (2013.01)

(58) Field of Classification Search
CPC .................................................... H04N 9/3167
USPC ........................................................ 348/53
See application file for complete search history.

(56) References Cited

U.S. PATENT DOCUMENTS

| | | | |
|---|---|---|---|
| 6,608,652 B1 | 8/2003 | Yamazaki et al. | |
| 2004/0090601 A1 | 5/2004 | Nakanishi et al. | |
| 2006/0039068 A1* | 2/2006 | Tokita et al. | ................. 359/483 |
| 2009/0103178 A1 | 4/2009 | Woodgate et al. | |

FOREIGN PATENT DOCUMENTS

| | | |
|---|---|---|
| JP | A 9-166768 | 6/1997 |
| JP | A 2004-206046 | 7/2004 |
| JP | A 2006-235145 | 9/2006 |
| JP | A 2007-17536 | 1/2007 |
| JP | A 2009-122659 | 6/2009 |
| JP | A 2011-48071 | 3/2011 |
| JP | A 2011-150363 | 8/2011 |

* cited by examiner

*Primary Examiner* — Sath V Perungavoor
*Assistant Examiner* — Jeffery Williams
(74) *Attorney, Agent, or Firm* — Oliff PLC

(57) ABSTRACT

A wavelength separation device includes a waveplate adapted to convert the polarization direction of light in a predetermined wavelength band so that right-eye and left-eye image light in a time-divisional manner can be separated into first outgoing light as first polarized light in a first wavelength band and second outgoing light as second polarized light in a second wavelength band, a polarization control element adapted to keep the polarization direction of the first and the second outgoing light input from the waveplate in the case of either one of the right-eye and the left-eye image light, and respectively change the polarization direction of the first and the second outgoing light input from the waveplate in the case of the other thereof, and a polarization plate adapted to absorb one of the first polarized light and the second polarized light, and transmit the other thereof.

7 Claims, 8 Drawing Sheets

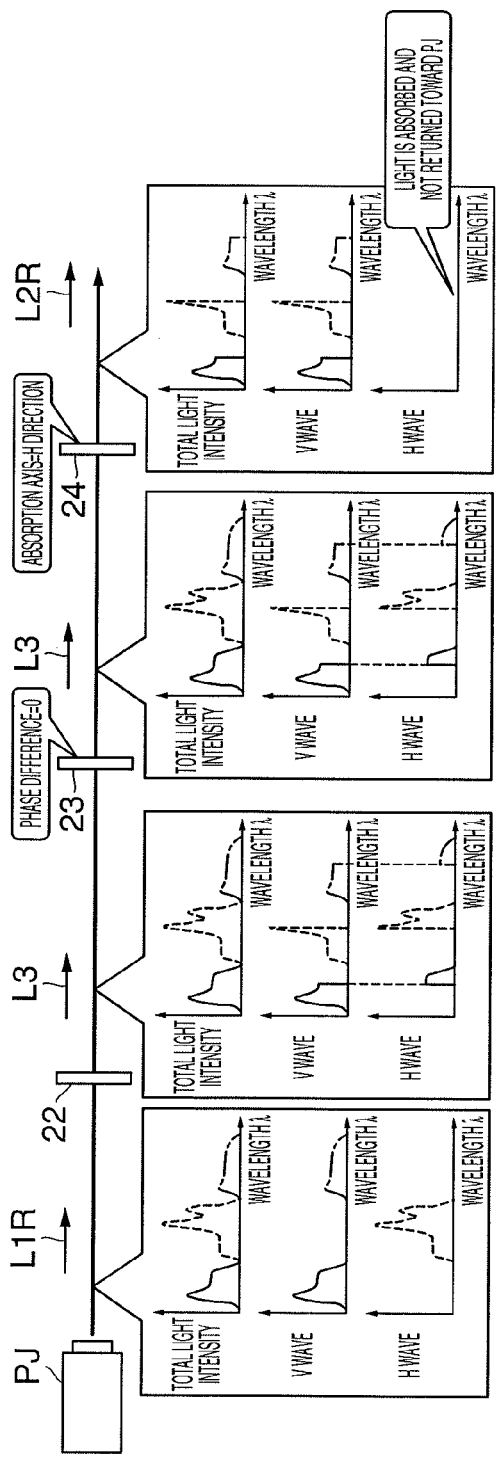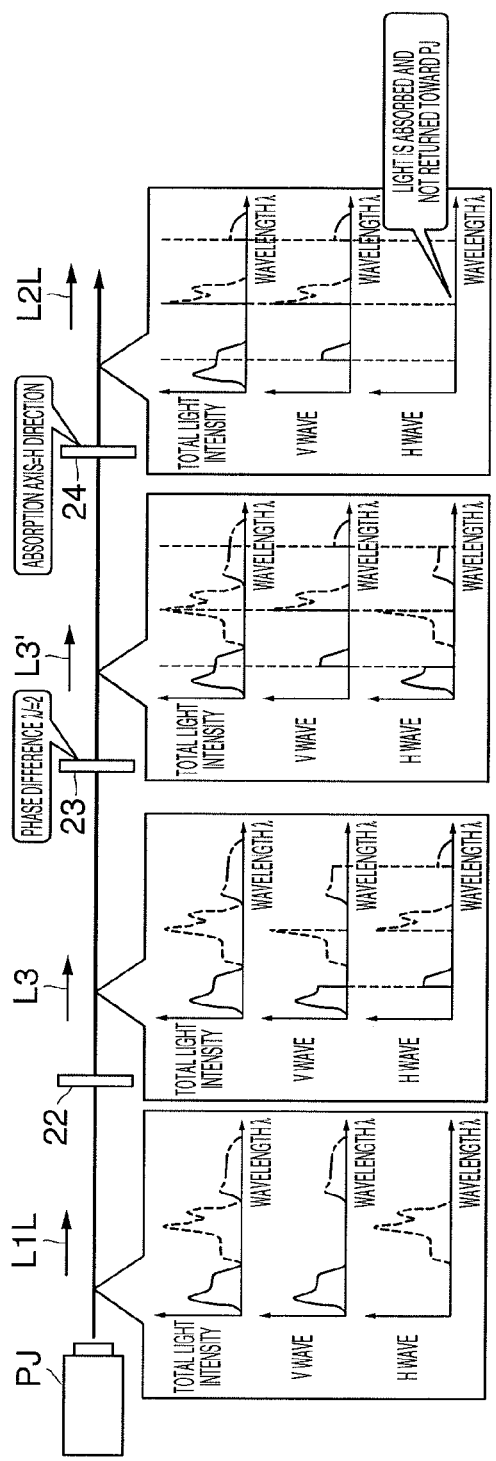
FIG. 6A
FIG. 6B

WAVELENGTH SEPARATION DEVICE, PROJECTOR, AND IMAGE DISPLAY SYSTEM

BACKGROUND

1. Technical Field

The present invention relates to a wavelength separation device, a projector, and an image display system for performing three-dimensional image display.

2. Related Art

In the past, there has been known an image display system for stereoscopically expressing the display image. According to such an image display system, the observer views two images (a right-eye image and a left-eye image) shifted an amount from each other, the amount corresponding to the difference between the view points of the right eye and the left eye, namely so-called parallax images, selectively with the right and left eyes, respectively. Thus, the observer can visually recognize the display image stereoscopically.

As one system used in such an image display system, there has been known a wavelength separation system described in, for example, JP-A-2009-122659. The wavelength separation system is a system for projecting two parallax images having respective wavelengths different from each other, and then separating the right-eye image and the left-eye image thus projected by the difference in wavelength and sorting them into the left eye and the right eye respectively.

However, in the image display system (hereinafter referred to as an image display system 90) described in JP-A-2009-122659, there has been a problem explained below with reference to FIGS. 7, and 8A through 8D.

FIG. 7 is a block diagram showing a configuration of the image display system 90. Further, FIGS. 8A through 8D are diagrams for explaining the action of the image display system 90.

As shown in FIG. 7, the image display system 90 is configured including a projector PJ, a control section 91, a rotating wheel 92 (a filter), a screen SR, and a pair of observation spectacles 30.

The outgoing light L1 emitted from the projector PJ is transmitted through the rotating wheel 92, the outgoing light L2 is projected on the screen SR to thereby display an image in an enlarged manner.

In the projector PJ, image data (right-eye image data or left-eye image data) is input from an external device, and the projector PJ converts the image data into the outgoing light L1 of the right-eye image and the left-eye image shown in FIG. 8A, and then emits it alternately to the rotating wheel 92 in a time-divisional manner.

As shown in FIG. 8B, the rotating wheel 92 is configured including a disk section 92a, and a rotary support mechanism (not shown in FIG. 8B) for rotatably supporting the disk section. The disk section 92a is formed of an area A1 provided with a fan-shaped color filter and an area A2 provided with a fan-shaped color filter. These areas A1, A2 selectively transmit the colored lights (blue light LB, green light LG, and red light LR) in predetermined wavelength bands, respectively, out of the incident light. FIG. 8C is a diagram showing the transmittance characteristics of the areas A1, A2. In FIG. 8C, the transmittance characteristic in the upper part shows the transmittance of the area A1 with respect to the wavelength of the light, and the transmittance characteristic in the lower part shows the transmittance of the area A2 with respect to the wavelength of the light. As shown in FIG. 8C, the area A1 transmits the light with the wavelength on the lower side of the wavelength band of each of the blue light LB, the green light LG, and the red light LR, and blocks the light with the wavelength on the higher side of the wavelength band. Further, the area A2 transmits the light with the wavelength on the higher side of the wavelength band of each of the blue light LB, the green light LG, and the red light LR, and blocks the light with the wavelength on the lower side of the wavelength band.

The control section 91 controls the rotation of the disk section 92a via the rotary support mechanism in sync with the timing of sequentially emitting the outgoing light L1 of the right-eye image and the left-eye image to the rotating wheel 92. For example, the control section 91 controls the rotation of the disk section 92a so that the outgoing light L1 enters the area A1 of the disk section 92a during the period of emitting the outgoing light L1 of the right-eye image, and the outgoing light L1 enters the area A2 of the disk section 92a during the period of emitting the outgoing light L1 of the left-eye image. It should be noted that the control section 91 controls the rotation of the disk section 92a based on the information for distinguishing the right-eye image data and the left-eye image data from each other, included in the image data input to the projector PJ.

Thus, the rotating wheel 92 projects the outgoing light L2 of the right-eye image and the outgoing light L2 of the left-eye image different in wavelength from each other on the screen SR in a time-series manner.

The observer wears the pair of spectacles 30 in order to view the parallax image displayed on the screen SR as a stereoscopic image. The pair of observation spectacles 30 has a right side glass 30R and a left side glass 30L. In accordance with the area A1 of the rotating wheel 92, the right side glass 30R transmits the light with the wavelength on the lower side of the wavelength band of each of the blue light LB, the green light LG, and the red light LR, and blocks the light with the wavelength on the higher side of the wavelength band. Further, in accordance with the area A2 of the rotating wheel 92, the left side glass 30L transmits the light with the wavelength on the higher side of the wavelength band of each of the blue light LB, the green light LG, and the red light LR, and blocks the light with the wavelength on the lower side of the wavelength band. As described above, the transmittance characteristics of the right side glass 30R and the left side glass 30L of the pair of observation spectacles 30 are made to coincide with the transmittance characteristics of the areas A1, A2 of the rotating wheel 92, respectively. Therefore, the observer can view the right-eye image and the left-eye image respectively with the right eye and the left eye due to the difference in wavelength by wearing the pair of observation spectacles 30, and can therefore visually recognize the stereoscopic image in a "pseudo" manner due to the human visual feature.

Here, the rotating wheel 92 has a configuration in which the area where the outgoing light L1 enters from the projector PJ is switched between the areas A1 and A2 when the disk section 92a rotates. Therefore, the period when the outgoing light L1 enters both of the areas A1, A2 exists when the area where the outgoing light L1 enters is switched from either one of the areas A1 and A2 to the other. FIG. 8D is a diagram showing the period when the outgoing light L1 enters both of the areas A1, A2 translated with the central angles of the disk sections (the disk section 92a, and the disk section 92b). The upper part of the drawing shows the fact that the outgoing light L1 enters both of the areas A1, A2 in the period corresponding to the angle α in the disk section 92a. Further, the lower part of the drawing shows the fact that the outgoing light L1 enters both of the areas A1, A2 in the period corresponding to the angle β in the disk section 92b. As the measure for reducing the period in which the outgoing light L1 enters both of the areas A1, A2, the measure explained below can be considered. That is, assuming that the number of revolutions per unit time of the rotating wheel 92 is constant, the measure of elongating the radius of the disk section constituting the rotating wheel 92 to thereby reduce the period corresponding to the angle α to the period corresponding to the angle β as shown in the upper part and the lower part of the drawing shown in FIG. 8D can be considered. However, by elongating the radius of the disk section constituting the rotating wheel 92 as in the measure described above, there arises a problem of incurring the growth of the area of the rotating wheel, and causing the increase in size of the image display system 90.

Further, although the rotating wheel 92 (the filter) blocks the light with a predetermined wavelength out of the incident light (the outgoing light L1) as described above, the rotating wheel 92 actually reflects the light toward the projector PJ without absorbing the light. The light intensity of the reflected light corresponds to an amount a half as high as that of the incident light (the outgoing light L1). Therefore, in the projector PJ to which the reflected light is input, there is a possibility of heating the projector PJ to thereby cause the deterioration of the quality (the quality of the display image) of the outgoing light L1 in such a manner, for example, that the rise in temperature of the light source (lamp) constituting the projector PJ is incurred.

SUMMARY

An advantage of some aspects of the invention is to achieve downsizing of the system by providing a wavelength separation device capable of realizing the wave separation without using the rotating wheel in the image display system using the wavelength separation system. Another advantage of some aspects of the invention is to improve the quality of the display image in the image display system by providing a wavelength separation device of preventing the light from being reflected toward the image display device (e.g., a projector) constituting the image display system.

An aspect of the invention is directed to a wavelength separation device including a waveplate to which image light of a right-eye image and image light of a left-eye image are input from an external device in a time-divisional manner, and adapted to convert a polarization direction of light in a predetermined wavelength band so that the image light of the right-eye image input and the image light of the left-eye image input can be separated into first outgoing light having a first wavelength band, and having a polarization direction of first polarized light and second outgoing light having a second wavelength band, and having a polarization direction of second polarized light different from the polarization direction of the first polarized light, and then emit the light, a polarization control element adapted to respectively emit the first outgoing light and the second outgoing light input through the waveplate without changing polarization directions of the first outgoing light and the second outgoing light in a case of either one of the image light of the right-eye image and the image light of the left-eye image, and respectively emit the first outgoing light and the second outgoing light after changing the polarization direction of the first outgoing light to the polarization direction of the second polarized light and changing the polarization direction of the second outgoing light to the polarization direction of the first polarized light in a case of the other of the image light of the right-eye image and the image light of the left-eye image, and a polarization plate having an absorption axis in one of the polarization directions of the first polarized light and the second polarized light, and transmitting and then emitting light having the other of the polarization directions.

Since the wavelength separation device according to this aspect of the invention is composed of the waveplate, the polarization control element, and the polarization plate, the wavelength separation can be achieved without using the rotating wheel in the image display system using the wavelength separation system. Further, the wavelength separation device according to this aspect of the invention separates outgoing light (the image light) of the right-eye image and the left-eye image, which are the light emitted from the image display device (e.g., a projector) for constituting the image display system, into the first outgoing light and the second outgoing light using the waveplate. The polarization control element to which the first outgoing light and the second outgoing light are input converts the first outgoing light and the second outgoing light into either one of the first polarized light and the second polarized light and the other thereof, respectively, and then emits the first outgoing light and the second outgoing light. The polarization plate has the absorption axis in the same polarization direction as the second polarized light, and therefore, absorbs the second polarized light not transmitted therethrough without reflecting it toward the image display device. Thus, it is possible to provide the wavelength separation device, which does not reflect the light toward the image display device constituting the image display system, and thus, it is possible to improve the quality of the display image in the image display system.

Another aspect of the invention is directed to a projector including the wavelength separation device described above to which the image light of the right-eye image and the image light of the left-eye image are input, and an image display device adapted to emit the image light of the right-eye image and the image light of the left-eye image to the wavelength separation device.

Since the projector according to this aspect of the invention is composed of the image display device and the wavelength separation device, the wavelength separation can be achieved without using the rotating wheel in the projector using the wavelength separation system. Further, since the projector according to this aspect of the invention has the wavelength separation device which does not reflect the light toward the image display device, it is possible to improve the quality of the display image in the projector.

Further, the wavelength separation device emits the first polarized light in the wavelength bands corresponding to the right-eye image and the second polarized light in the wavelength bands corresponding to the left-eye image in a time-divisional manner. By wearing the pair of observation spectacles (a pair of glasses), the observer can view the right-eye image and the left-eye image selectively with the right eye and the left eye, respectively, as the parallax images with respective wavelengths different from each other. Thus, even if the polarization axes of the blue light LB, the green light LG, and the red light LR emitted by the projector are different from each other, the projector using the wavelength separation system can be provided.

Still another aspect of the invention is directed to the projector according to the above aspect of the invention, which further includes a control section adapted to perform switching of the polarization direction of the light in a pixel area of the polarization control element in sync with a beginning time point of a predetermined period with which a liquid crystal panel provided to the image display device is driven using a frame sequential drive system of driving scan lines in a lump.

According to the configuration described above, in the case of driving the liquid crystal panel provided to the projector in a frame-sequential manner, the control section performs the switching of the polarization direction of the light in the pixel area of the polarization control element in sync with the drive of the liquid crystal panel of the image display device. Therefore, the switching timing between the right-eye image and the left-eye image emitted by the image display device, and the timing at which the wavelength separation device emits the first polarized light in the wavelength band corresponding to the right-eye image, and the second polarized light in the wavelength band corresponding to the left-eye image are adjusted to be the most appropriate timing. Thus, by wearing the pair of observation spectacles, the observer can view the right-eye image and the left-eye image selectively with the right eye and the left eye, respectively, as the parallax images with respective wavelengths different from each other.

Yet another aspect of the invention is directed to the projector according to the above aspect of the invention, which further includes a plurality of pixel areas disposed in the polarization control element, and a control section adapted to perform driving of switching between a state of keeping the polarization direction and a state of changing the polarization direction for each of the pixel areas of the polarization control element in accordance with sequential drive of scan lines of a liquid crystal panel provided to the image display device in a case in which the image display device drives the liquid crystal panel with a predetermined period using a line sequential drive system of sequentially driving the scan lines.

According to the configuration described above, in the case of driving the liquid crystal panel provided to the image display device in a line-sequential manner, the control section performs the switching of the polarization direction of the light in each of the pixel areas of the polarization control element in sync with the drive of the liquid crystal panel of the image display device. Therefore, the switching timing between the right-eye image and the left-eye image emitted by the image display device, and the timing at which the wavelength separation device emits the first polarized light in the wavelength band corresponding to the right-eye image, and the second polarized light in the wavelength band corresponding to the left-eye image are adjusted to be the most appropriate timing. Thus, the phenomenon that the right-eye image enters the left eye or the left-eye image enters the right eye, which occurs in the transition of either one of the right-eye image and the left-eye image to the other, namely so-called crosstalk phenomenon can be suppressed.

Still yet another aspect of the invention is directed to an image display system including the projector according to any one of the aspects described above, and a pair of spectacles having a right-eye side and a left-eye side, either one of which has a transmission property of transmitting the light in the first wavelength band, and the other of which has a transmission property of transmitting the light in the second wavelength band.

According to the configuration described above, by wearing the pair of observation spectacles (the pair of glasses), the observer can view the right-eye image and the left-eye image selectively with the right eye and the left eye, respectively, as the parallax images with respective wavelengths different from each other.

BRIEF DESCRIPTION OF THE DRAWINGS

The invention will be described with reference to the accompanying drawings, wherein like numbers reference like elements.

FIGS. 6A and 6B are diagrams for explaining the action of the image display system 10.

DESCRIPTION OF AN EXEMPLARY EMBODIMENT

Figure 1:
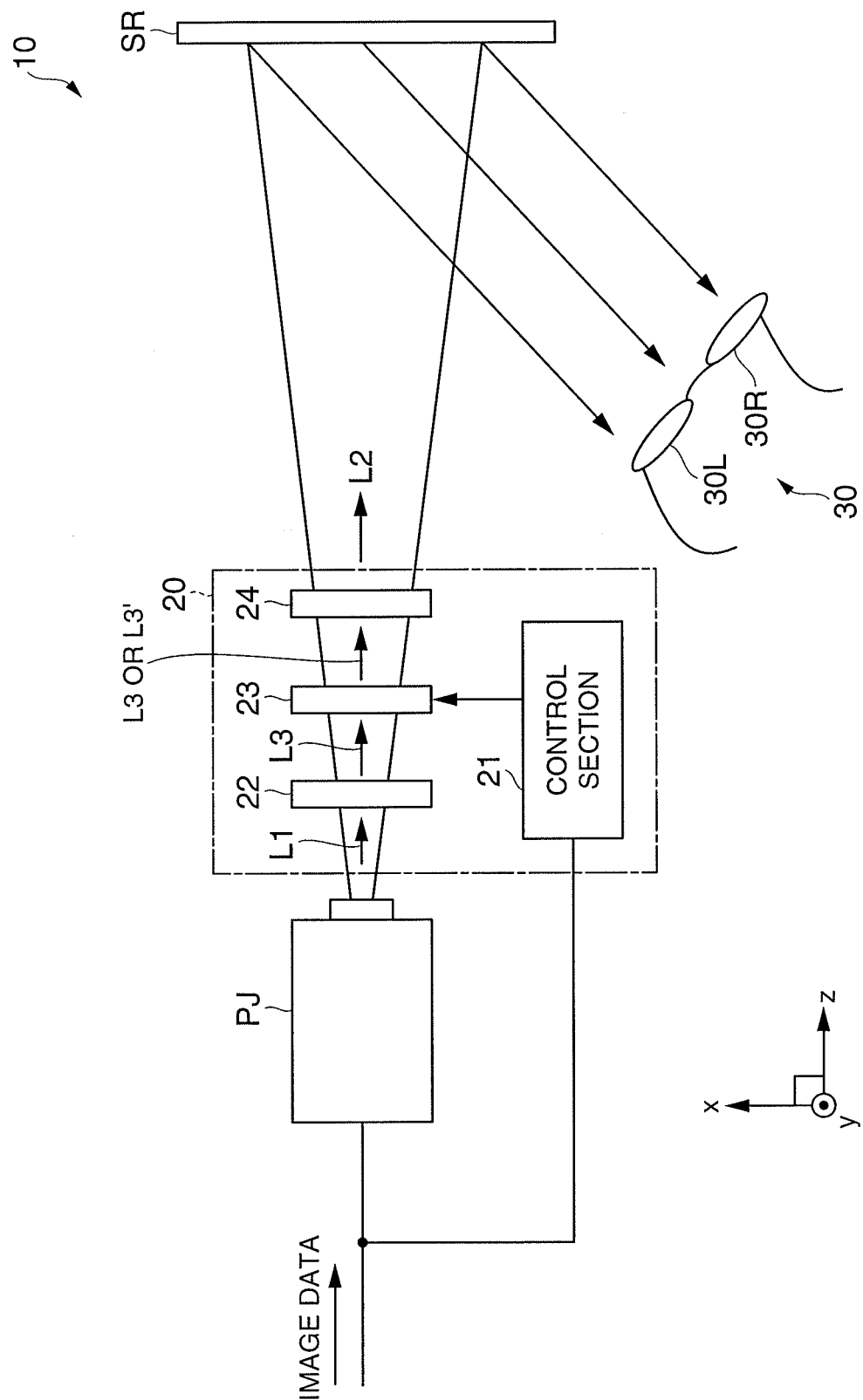
FIG. 1 is a block diagram showing a configuration of an image display system 10.
Figure 2:
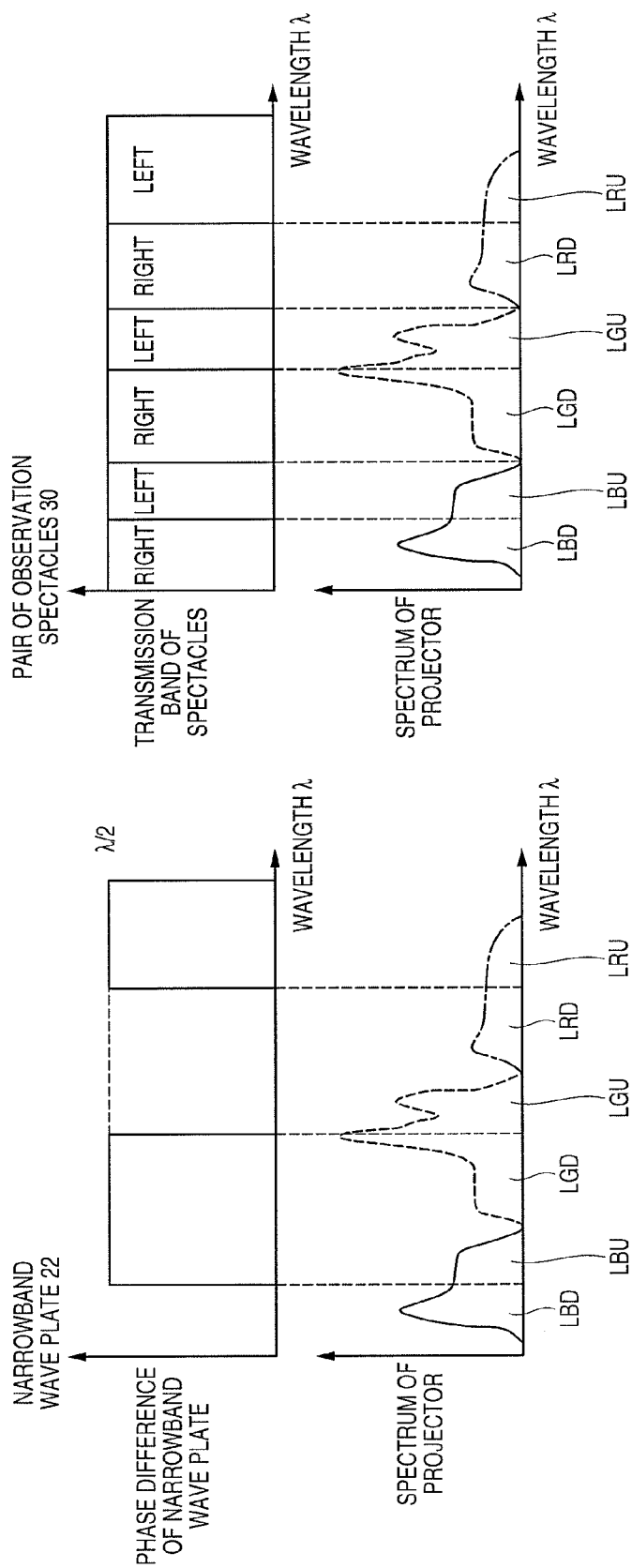
FIGS. 2A and 2B are diagrams for explaining characteristics of components constituting the image display system 10.
Figure 7:
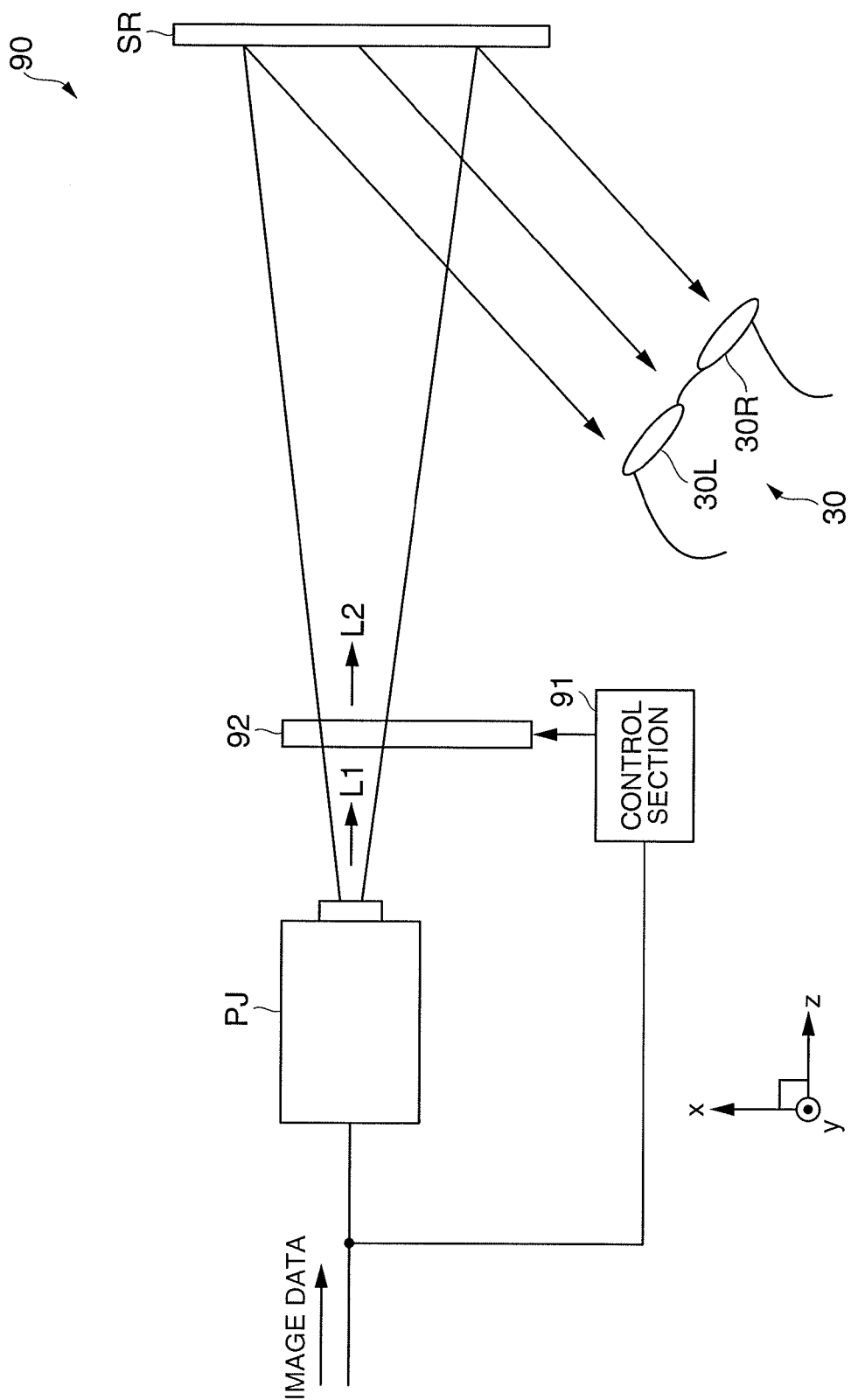
FIG. 7 is a block diagram showing a configuration of an image display system 90.
Figure 8D:
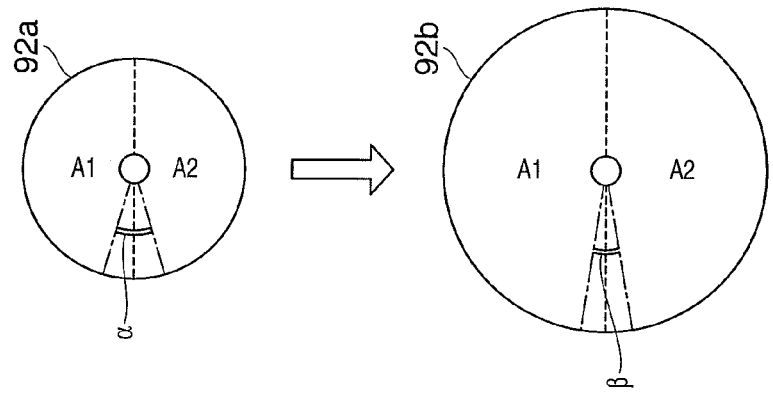
FIGS. 8A through 8D are diagrams for explaining the action of the image display system 90.
Figure 8C:
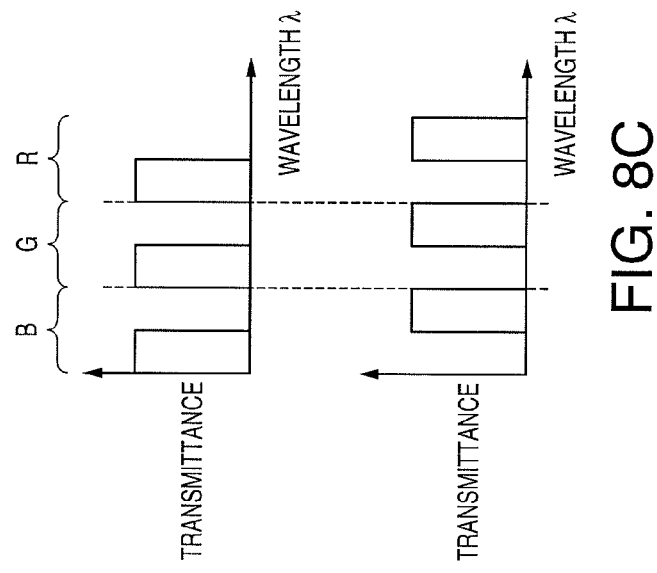
Figure 8A:
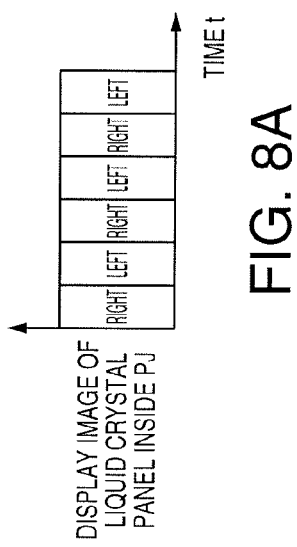
Figure 8B:
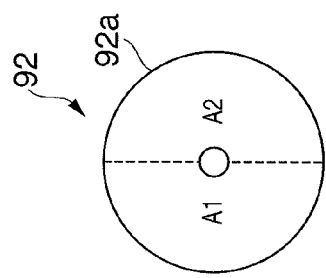

Hereinafter, an embodiment of the invention will be described with reference to the accompanying drawings. FIG. 1 is a block diagram showing a configuration of an image display system 10 for performing stereoscopic view of an image using a wavelength separation device 20 according to the embodiment of the invention. Further, FIGS. 2A and 2B are diagrams for explaining the characteristics of the components constituting the image display system 90. It should be noted that in FIG. 1, the same parts as those shown in FIG. 7 are denoted with the same reference symbols, and the explanation therefor will be omitted if appropriate.

In the present embodiment, an image display system, which displays the right-eye image and the left-eye image having the respective wavelengths different from each other as parallax images for stereoscopic view to a screen SR in a time-divisional manner using a projector PJ, will be explained.

As shown in FIG. 1, the image display system 10 is configured including the projector PJ, a wavelength separation device 20, the screen SR, and a pair of observation spectacles 30.

The projector PJ converts the image data (the right-eye image data and the left-eye image data) supplied from an external device into the outgoing light of the image, and then emits them alternately with a certain predetermined period in a time-divisional manner as the outgoing light L1 of the right-eye image and the left-eye image. Hereinafter, the outgoing light of the right-eye image is defined as outgoing light L1R (the image light of the right-eye image), and the outgoing light of the left-eye image is defined as outgoing light L1L (the image light of the left-eye image). It should be noted that in the present embodiment, the projector PJ emits the outgoing light L1 with the red light LR and the blue light LB having vertical polarization, and the green light LG having horizontal polarization. Further, in the present embodiment, the explanation will be presented defining that the light propagating in parallel to the z-axis direction and having the polarization axis in the x-axis direction (the vertical direction in FIG. 1) is the vertically polarized light, and the light propagating in parallel to the z-axis direction and having the polarization axis in the y-axis direction (the direction perpendicular to the plane including the x-axis and the z-axis) is the horizontally polarized light.

The wavelength separation device 20 is composed of a control section 21, a narrowband waveplate 22, a polarizing liquid crystal panel 23, and a polarization plate 24.

The control section 21 is supplied with the image data substantially the same as that supplied to the projector PJ, and extracts the identification information for identifying the right-eye image data and the left-eye image data included in the image data. Further, the control section 21 detects the switching timing between the outgoing light L1R and the outgoing light L1L emitted by the projector PJ based on the identification information thus extracted. Then, the control section 21 outputs control information, which represents which one of the outgoing light L1R and the outgoing light L1L is emitted from the projector PJ, to the polarizing liquid crystal panel 23 in sync with the switching timing thus detected.

The narrowband waveplate 22 (the waveplate) separates each of the blue light LB, the green light LG, and the red light LR into the outgoing lights having the relationship in which the respective wavelength bands within the wavelength band of each of the colored lights are different from each other, and the respective polarization axes rotated 90° from each other, and then outputs the result. Here, FIG. 2A is a diagram showing the characteristics of the narrowband waveplate 22. The drawing in the upper part of FIG. 2A is a diagram showing the presence or absence of the phase difference of a half wavelength in the incident light of the narrowband waveplate 22, and the drawing in the lower part of FIG. 2A shows the spectrum, namely the intensity (light intensity) at each wavelength, of the outgoing light L1 of the projector PJ.

The narrowband waveplate 22 emits the blue light LB as the blue light LBD without generating the phase difference in the lower side of the wavelength band, and emits it as the blue light LBU while generating the phase difference of a half wavelength in the upper side of the wavelength band. Further, the narrowband waveplate 22 emits the green light LG as the green light LGD while generating the phase difference of a half wavelength in the lower side of the wavelength band, and emits it as the green light LGU without generating the phase difference in the upper side of the wavelength band. Further, the narrowband waveplate 22 emits the red light LR as the red light LRD without generating the phase difference in the lower side of the wavelength band, and emits it as the red light LRU while generating the phase difference of a half wavelength in the upper side of the wavelength band.

It should be noted that in the narrowband waveplate 22, the wavelength bands in which the phase difference of a half wavelength is generated are set in advance based on an experiment and so on. For example, they are set so that the integral values obtained by integrating the light intensity of the colored light to be separated with respect to the wavelength are equal to each other within the wavelength band of each of the colored lights. Alternatively, it is also possible to set the wavelength bands together with the intensity of each of the colored lights so that the observer, who wears the pair of observation spectacles 30 having the same spectrum characteristics as the narrowband waveplate 22, selectively views the right-eye image and the left-eye image, and has no uncomfortable feeling with respect to each of the colors of each of the images.

In the present embodiment, the projector PJ emits the outgoing light L1 with the red light LR and the blue light LB having vertical polarization, and the green light LG having horizontal polarization. Therefore, the narrowband waveplate 22 converts the polarization state in accordance with the wavelength band of the outgoing light L1 of the projector PJ to thereby convert the outgoing light L1 into the light, which can be separated by the polarization direction, and then emits the light as the outgoing light L3. Here, the outgoing light L3 includes outgoing light L31 (the blue light LBD, the green light LGD, and the red light LRD) as the vertically polarized light, and outgoing light L32 (the blue light LBU, the green light LGU, and the red light LRU) as the horizontally polarized light.

In other words, the narrowband waveplate 22 converts it into the light which can be separated in accordance with the polarization direction into the outgoing light L31 (the first outgoing light) having the first wavelength band, and having the polarization direction equal to the first polarized light (the vertically polarized light), and the outgoing light L32 (the second outgoing light) having the second wavelength band, and having the polarization direction equal to the second polarized light (the horizontally polarized light) different by 90° from the first polarized light, and then emits the resulted light. Here, the first wavelength band denotes the band in which the narrowband waveplate 22 does not generate the phase difference of a half wavelength if the colored lights (the red light LR and the blue light LB in the present embodiment) included in the outgoing light L1 are vertically polarized. Further, the first wavelength band denotes the band in which the narrowband waveplate 22 generates the phase difference of a half wavelength if the colored light (the green light LG in the present embodiment) included in the outgoing light L1 is horizontally polarized. In the present embodiment, the first wavelength band corresponds to the light to be made to enter the right eye of the observer.

On the other hand, the second wavelength band denotes the band in which the narrowband waveplate 22 generates the phase difference of a half wavelength if the colored lights (the red light LR and the blue light LB in the present embodiment) included in the outgoing light L1 are vertically polarized. Further, the second wavelength band denotes the band in which the narrowband waveplate 22 does not generate the phase difference of a half wavelength if the colored light (the green light LG in the present embodiment) included in the outgoing light L1 is horizontally polarized. In the present embodiment, the second wavelength band corresponds to the light to be made to enter the left eye of the observer.

The polarizing liquid crystal panel 23 (the polarization control element) determines whether or not the voltages are to be applied to the internal pixels in accordance with the control information from the control section 21, and then controls whether or not the phase difference of a half wavelength is to be generated in accordance with the determination result. For example, the polarizing liquid crystal panel 23 generates the phase difference of a half wavelength in the case (the ON state) in which the voltages are applied to the internal pixels, and does not generate the phase difference of a half wavelength in the case (the OFF state) in which the voltages are not applied to the internal pixels.

Therefore, the polarizing liquid crystal panel 23 emits the outgoing light L3 when the control section 21 detects the fact that the outgoing light of the projector PJ has been switched from the outgoing light L1L of the left-eye image to the outgoing light L1R of the right-eye image (the case of the right-eye image). Specifically, the polarizing liquid crystal panel 23 emits the outgoing light L3 (the incident light input thereto) of the narrowband waveplate 22 without changing the polarization direction of the outgoing light L31 (the first outgoing light) as the vertically polarized light and the outgoing light L32 (the second outgoing light) as the horizontally polarized light, respectively.

Further, the polarizing liquid crystal panel 23 emits the outgoing light L3' when the control section 21 detects the fact that the outgoing light of the projector PJ has been switched from the outgoing light L1R of the right-eye image to the outgoing light L1L of the left-eye image (the case of the left-eye image). Specifically, the polarizing liquid crystal panel 23 emits the outgoing light L3 of the narrowband waveplate 22 after changing the polarization direction of the outgoing light L31 as the vertically polarized light to the horizontally polarized light (defined as the outgoing light L31'), and the polarization direction of the outgoing light L32 as the horizontally polarized light to the vertically polarized light (defined as the outgoing light L32'), respectively.

The polarization plate 24 (the polarization plate) has the absorption axis in the same polarization direction as that of the horizontally polarized light (the second polarized light), and emits the vertically polarized light (the first polarized light), which has been input from the polarizing liquid crystal panel 23, as the outgoing light L2. Therefore, in the case in which the polarizing liquid crystal panel 23 emits the outgoing light L3, the polarization plate 24 transmits the outgoing light L31 as the vertically polarized light, and absorbs the outgoing light L32 as the horizontally polarized light without reflection. Further, in the case in which the polarizing liquid crystal panel 23 emits the outgoing light L3', the polarization plate 24 transmits the outgoing light L32' as the vertically polarized light, and absorbs the outgoing light L31' as the horizontally polarized light without reflection.

According to the configuration described above, the wavelength separation device 20 emits the light having the wavelength in the first wavelength band as outgoing light L2R as the vertically polarized light out of the outgoing light L1R, which is the outgoing light of the right-eye image emitted by the projector PJ. Further, the wavelength separation device 20 emits the light having the wavelength in the second wavelength band as outgoing light L2L as the vertically polarized light out of the outgoing light L1L, which is the outgoing light of the left-eye image emitted by the projector PJ.

It should be noted that the wavelength separation device 20 can also be configured by stacking the narrowband waveplate 22, the polarizing liquid crystal panel 23, and the polarization plate 24 described above one another.

On the screen SR, the outgoing light L2R of the right-eye image emitted from the wavelength separation device 20 and the outgoing light L2L of the left-eye image different in wavelength band from the outgoing light L2R of the right-eye image are projected with a predetermined period in a time-divisional manner.

The pair of observation spectacles 30 (a pair of glasses) is provided with a right side glass 30R (the right-eye side) having the transmission characteristics for transmitting the outgoing light L2R of the right-eye image reflected by the screen SR, and a left side glass 30L (the left-eye side) having the transmission characteristics for transmitting the outgoing light L2L of the left-eye image reflected by the screen SR.

FIG. 2B is a diagram showing the characteristics of the pair of observation spectacles 30. The drawing in the upper part of FIG. 2B is a diagram showing the transmission regions of the right side glass 30R and the left side glass 30L, and the drawing in the lower part of FIG. 2B shows the spectrum, namely the light intensity at each wavelength, of the outgoing light L1 of the projector PJ.

The pair of observation spectacles 30 has the transmission characteristics corresponding to the spectrum characteristics of the narrowband waveplate 22. Specifically, the right side glass 30R transmits the blue light LBD, the green light LGD, and the red light LRD in the respective first wavelength bands, and blocks the blue light LBU, the green light LGU, and the red light LRU in the respective second wavelength bands. Further, the left side glass 30L blocks the blue light LBD, the green light LGD, and the red light LRD in the respective first wavelength bands, and transmits the blue light LBU, the green light LGU, and the red light LRU in the respective second wavelength bands.

Therefore, when the observer wears the pair of observation spectacles 30 and views the screen SR, it results that the outgoing light L2R of the right-eye image enters the right eye, and the outgoing light L2L of the left-eye image enters the left eye, and thus, the pseudo stereoscopic view can be performed with these parallax images.

Figure 3:
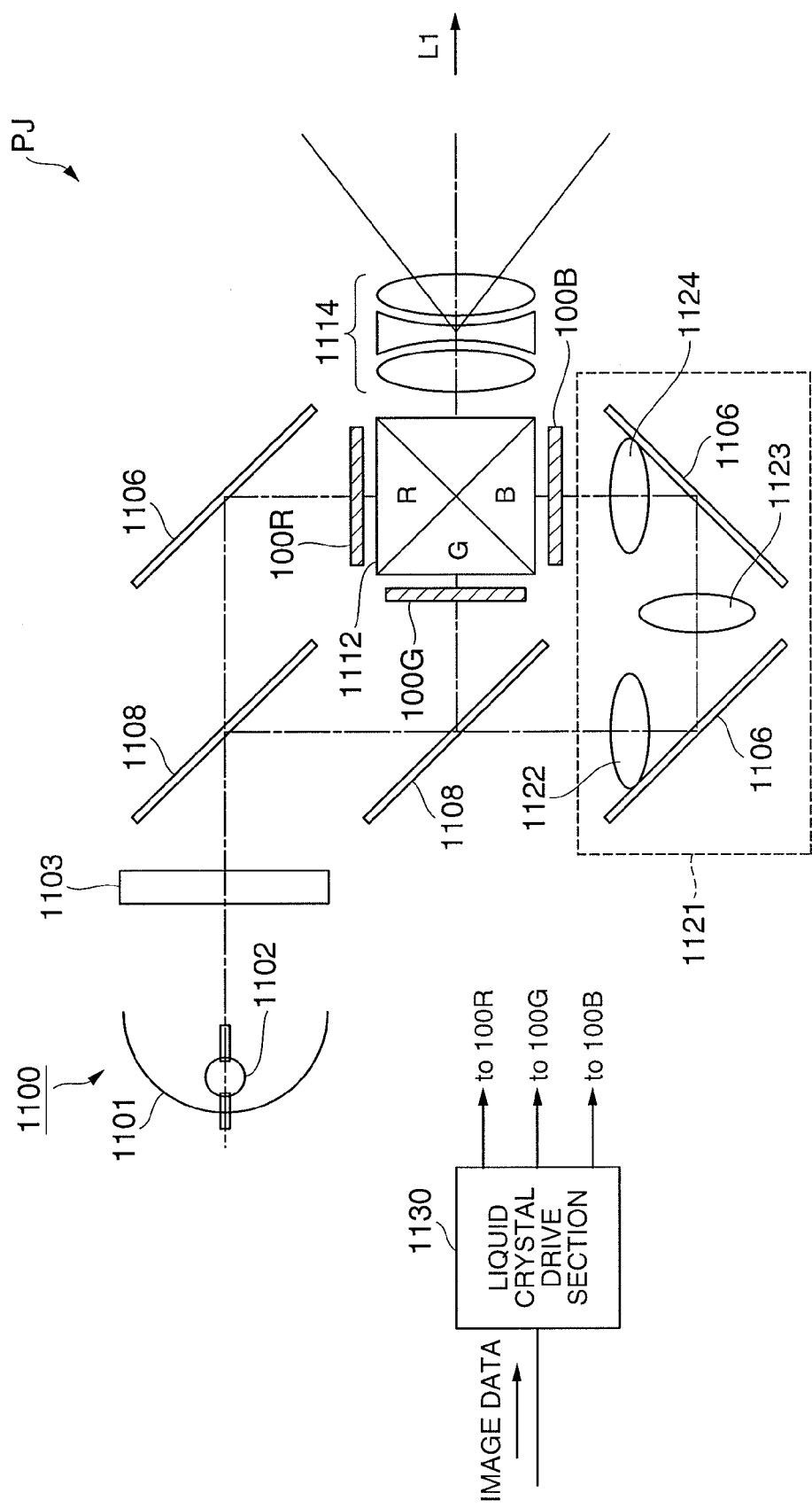
FIG. 3 is a schematic configuration diagram showing an example of the projector PJ.

Then, the configuration and the action of the projector PJ will be explained with reference to FIG. 3. FIG. 3 is a schematic configuration diagram showing an example of a so-called three-panel projector PJ using three liquid crystal light valves. The projector PJ is provided with a light source 1100, reflecting mirrors 1106, dichroic mirrors 1108, relay lenses 1122, 1123, and 1124, a red-light liquid crystal light valve 100R, a green-light liquid crystal light valve 100G, and a blue-light liquid crystal light valve 100B. Further, the projector PJ is provided with a cross dichroic prism 1112, a projection lens system 1114, and a liquid crystal drive section 1130.

The light source 1100 is provided with a lamp 1102 such as a metal halide lamp, a reflector 1101 for reflecting the light of the lamp 1102, and a polarization conversion element 1103 for converting non-polarized light from the reflector 1101 into a unique linearly polarized light. The polarization conversion element 1103 is provided with a polarization separation film, a reflecting film and a λ/2 waveplate not shown, and separates the light from the reflector 1101 into two types of linearly polarized light with the polarization separation film, aligns the directions in which the two types of linearly polarized light thus separated into with the reflecting film advance, and then converts one of the two types of linearly polarized light into the polarization direction of the other with the λ/2 waveplate. In the present embodiment, the polarization conversion element 1103 converts the non-polarized light from the reflector 1101 into the linearly polarized light in the vertical direction (the direction perpendicular to the sheet of FIG. 3), and then emits the linearly polarized light. The dichroic mirror 1108 for reflecting blue light and green light transmits red light out of white light emitted form the light source 1100, and at the same time reflects the blue light and the green light. The red light thus transmitted is reflected by the reflecting mirror 1106, and then enters the red-light liquid crystal light valve 100R. The red-light liquid crystal light valve 100R is provided with a λ/2 waveplate, an entrance side polarization plate, a liquid crystal panel, and an exit side polarization plate all not shown. The light from the reflecting mirror 1106 is converted into linearly polarized light in the horizontal direction (the direction parallel to the sheet of FIG. 3) by the λ/2 waveplate, and enters the liquid crystal panel via the entrance side polarization plate for transmitting the linearly polarized light in the horizontal direction. The light having entered the liquid crystal panel is modulated in accordance with the image data corresponding to the red light, and only the vertically polarized component of the light thus modulated is emitted to the dichroic mirror 1108 by the exit side polarization plate.

On the other hand, the green light out of the colored lights reflected by the dichroic mirror 1108 is reflected by the dichroic mirror 1108 for reflecting the green light, and then enters the green-light liquid crystal light valve 100G. The green-light liquid crystal light valve 100G is provided with an entrance side polarization plate, a liquid crystal panel, and an exit side polarization plate all not shown. The light from the dichroic mirror 1108 enters the liquid crystal panel via the entrance side polarization plate for transmitting the linearly polarized light in the vertical direction. The light having entered the liquid crystal panel is modulated in accordance with the image data corresponding to the green light, and only the horizontally polarized component of the light thus modulated is emitted to the dichroic mirror 1108 by the exit side polarization plate.

On the other hand, the blue light is also transmitted through the dichroic mirror 1108. With respect to the blue light, in order to compensate the light path length different from those of the green light and the red light, there is provided a light guide section 1121 formed of a relay lens system composed of the relay lens 1122 as an entrance lens, the relay lens 1123, and the relay lens 1124 as an exit lens. The blue light enters the blue-light liquid crystal light valve 100B via the light guide section 1121. The blue-light liquid crystal light valve 100B is provided with a λ/2 waveplate, an entrance side polarization plate, a liquid crystal panel, and an exit side polarization plate all not shown. The light from the relay lens 1124 is converted into linearly polarized light in the horizontal direction (the direction parallel to the sheet of FIG. 3) by the λ/2 waveplate, and enters the liquid crystal panel via the entrance side polarization plate for transmitting the linearly polarized light in the horizontal direction. The light having entered the liquid crystal panel is modulated in accordance with the image data corresponding to the blue light, and only the vertically polarized component of the light thus modulated is emitted to the dichroic mirror 1108 by the exit side polarization plate.

Here, in the respective liquid crystal light valves, the Red-Green-Blue (RGB) components of the image data are respectively controlled by the liquid crystal drive section 1130 as the red light, the green light, and the blue light.

The three colored lights respectively modulated by the red-light liquid crystal light valve 100R, the green-light liquid crystal light valve 100G, and the blue-light liquid crystal light valve 100B enter the cross dichroic prism 1112. The cross dichroic prism 1112 is formed by bonding four rectangular prisms to each other, and is provided with a dielectric multilayer film for reflecting the red light and a dielectric multilayer film for reflecting the blue light formed on the inside surfaces so as to form a crisscross. The three colored lights are combined by these dielectric multilayer films to thereby form the light for expressing a color image. The light thus combined is projected on the screen SR by the projection lens system 1114 as a projection section via the wavelength separation device 20, and thus the display images of the respective liquid crystal light valves are displayed on the screen SR in an enlarged manner.

Figure 4A:
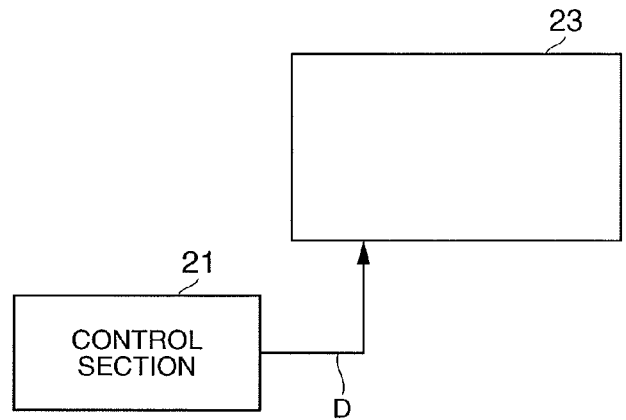
FIGS. 4A and 4B are diagrams for explaining the frame sequential drive method.
Figure 4B:
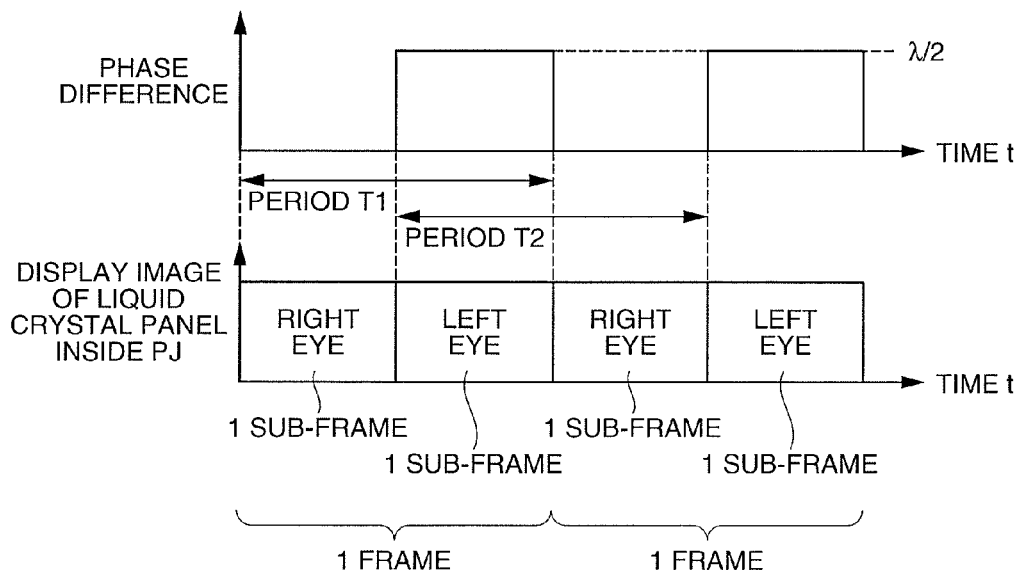
Figure 5A:
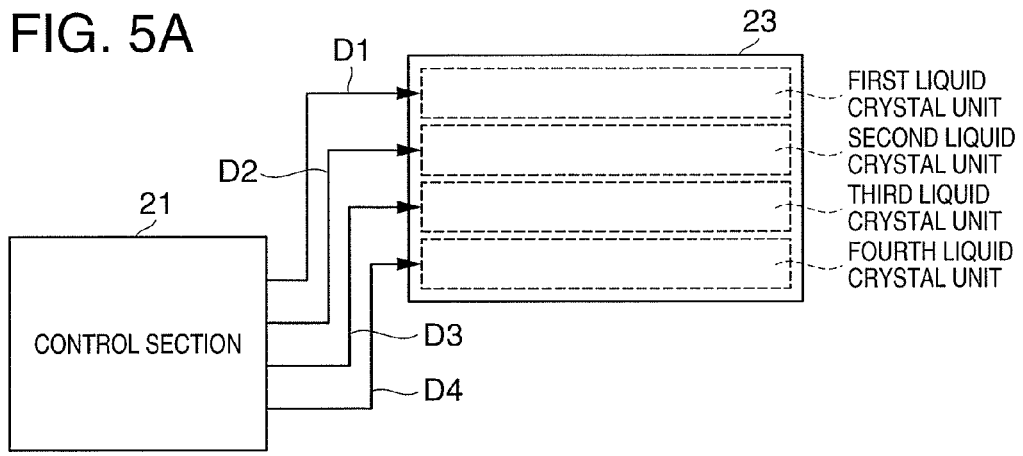
FIGS. 5A and 5B are diagrams for explaining the line sequential drive method.
Figure 5B:
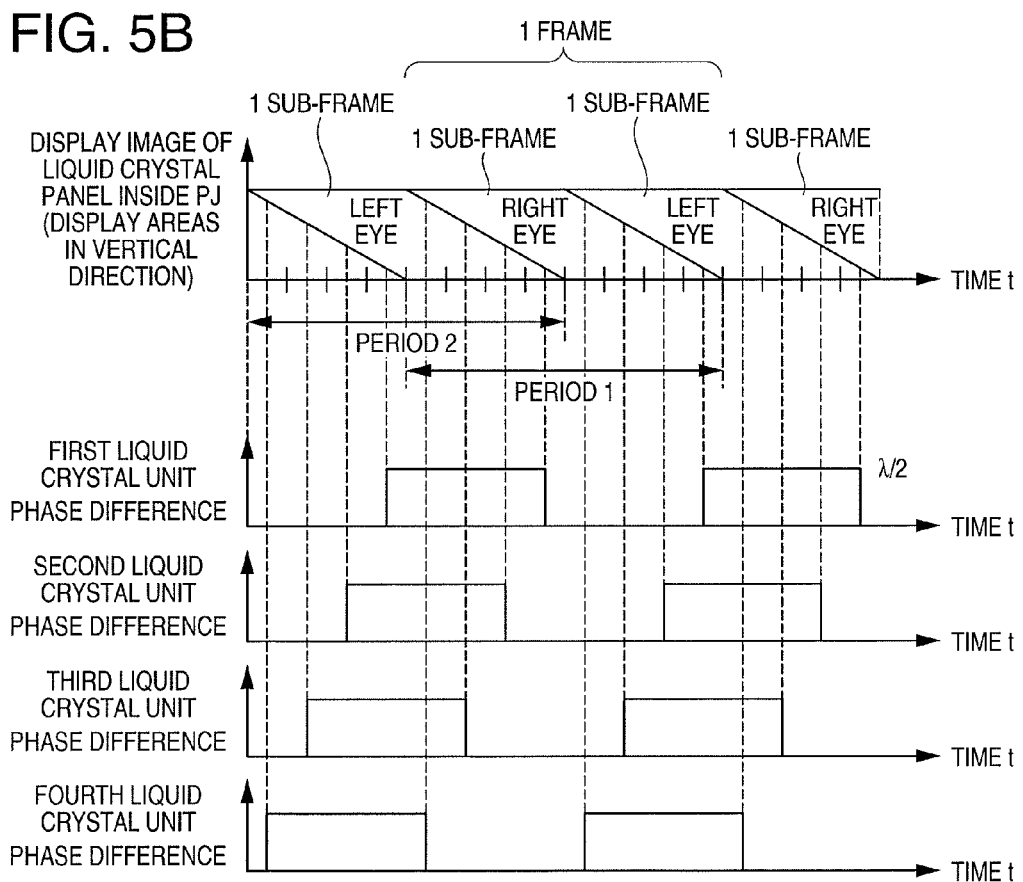

Then, a drive system for driving the red-light liquid crystal light valve 100R, the green-light liquid crystal light valve 100G, and the blue-light liquid crystal light valve 100B (the liquid crystal panels provided to the image display device), and the action of the control section 21 in the drive system will be explained. FIGS. 4A and 4B are diagrams showing the configuration and the action of the control section 21 in the case of driving the red-light liquid crystal light valve 100R, the green-light liquid crystal light valve 100G, and the blue-light liquid crystal light valve 100B adopting the frame sequential drive system for driving the scan lines in a lump. Further, FIGS. 5A and 5B are diagrams showing the configuration and the action of the control section 21 in the case of driving the red-light liquid crystal light valve 100R, the green-light liquid crystal light valve 100G, and the blue-light liquid crystal light valve 100B adopting the line sequential drive system for sequentially driving the scan lines.

The red-light liquid crystal light valve 100R, the green-light liquid crystal light valve 100G, and the blue-light liquid crystal light valve 100B described above each have a configuration provided with a liquid crystal panel having a pair of substrates and a liquid crystal held between the substrates, and entrance side and exit side polarization plates, and a plurality of pixels, the transmittance of which can independently be controlled, arranged in a matrix. In the light transmission region of the liquid crystal panel, there are disposed a plurality of scan lines and a plurality of data lines so as to intersect with each other. It should be noted that the liquid crystal panel in each of the liquid crystal light valves has the sequential direction (the vertical direction) coinciding with the direction perpendicular to the sheet of FIG. 3. In other words, a plurality of scan lines in each of the liquid crystal panels is disposed in a lateral direction (the direction parallel to the sheet of FIG. 3) perpendicular to the vertical direction.

In the case in which the frame sequential drive system is adopted for the projector PJ, the liquid crystal drive section 1130 supplies the plurality of data lines with the image data, and at the same time drives the plurality of scan lines in a lump, namely scans the scan lines in a frame-sequential manner. Thus, the image data is written in a lump to the plurality of pixels (a pixel group) arranged in the row direction corresponding to each of the scan lines.

For example, the red-light liquid crystal light valve 100R for modulating the red light performs the light modulation on the red light, which is input thereto, based on the image data to thereby emit the image light including the optical image inside. The operations of the green-light liquid crystal light valve 100G for modulating the green light and the blue-light liquid crystal light valve 100B for modulating the blue light are substantially the same as that of the red-light liquid crystal light valve 100R.

In the case of the present embodiment, the image data (one frame) is composed of left-eye image data and right-eye image data. The right-eye image data (one sub-frame) is written to each of the liquid crystal light valves in a frame-sequential manner, and the left-eye image data (one sub-frame) is written thereto in the temporally adjacent period to the right-eye image data in a frame-sequential manner. The writing operation described above is repeated, and thus the right-eye image data and the left-eye image data are written alternately to each of the liquid crystal light valves. Each of the liquid crystal light valves performs the light modulation based on the right-eye image data or the left-eye image data thus written. Here, the frame rate of each of the sub-frames is set to, for example, 120 Hz by the liquid crystal drive section 1130. As shown in the lower part of FIG. 4B, each of the liquid crystal light valves alternately displays the right-eye image data and the left-eye image data with predetermined periods T1, T2, respectively, and at the same time switches the display from either one of the right-eye image data and the lift-eye image data to the other with respect to the entire liquid crystal screen. For example, (period T1)=(period T2)=60 Hz (1/60=16.6 millisecond) is set to thereby display each of the right-eye image data and the left-eye image data for a period of 8.3 millisecond, and at the same time switch the display from either one of the right-eye image data and the left-eye image data to the other with respect to the entire liquid crystal screen.

On the other hand, in the case in which the line sequential drive system is adopted for the projector PJ, the liquid crystal drive section 1130 supplies the plurality of data lines with the image data, and at the same time sequentially drives the plurality of scan lines from one side to the other side, namely scans the scan lines in a line-sequential manner. Thus, the image data is written sequentially to the plurality of pixels (a pixel group) arranged in the row direction corresponding to each of the scan lines.

The right-eye image data (one sub-frame) is written to each of the liquid crystal light valves in a line-sequential manner, and the left-eye image data (one sub-frame) is written thereto in the temporally adjacent period to the right-eye image data in a line-sequential manner. The writing operation described above is repeated, and thus the right-eye image data and the left-eye image data are written alternately to each of the liquid crystal light valves. Each of the liquid crystal light valves performs the light modulation based on the right-eye image data or the left-eye image data thus written. Here, the frame rate of each of the sub-frames is assumed to be set to, for example, 60 Hz by the liquid crystal drive section 1130 similarly to the frame sequential drive system. As shown in the upper part of FIG. 5B, each of the liquid crystal light valves alternately displays the right-eye image data and the left-eye image data with predetermined periods T1, T2, respectively, and at the same time switches the display from either one of the right-eye image data and the lift-eye image data to the other. Assuming, for example, (period T1)=(period T2)=60 Hz (1/60=16.6 millisecond), each of the liquid crystal light valves switches the display in such a manner as described below. Specifically, each of the liquid crystal light valves switches the display while performing the display on each of the scan lines for a period of 8.3 millisecond from either one of the sides to the other, from the upper side to the lower side in the vertical direction of the liquid crystal panel.

Firstly, the configuration and the action of the polarizing liquid crystal panel 23 in the case of adopting the frame sequential drive system described above for the projector PJ. The polarizing liquid crystal panel 23 is provided with a pair of substrates and the liquid crystal sandwiched between the substrates, and has a configuration (a pixel area) having a plurality of pixels arranged in a matrix, each of the pixels providing the light transmitted therethrough with a phase difference, which can be controlled in accordance with the control signal from the control section 21. Further, in the light transmission region of the polarizing liquid crystal panel 23, there is provided one drive line (referred to as a drive line D).

As shown in FIG. 4A, the control section 21 has a configuration of applying a predetermined voltage to the drive line D as a control signal. Then, if the control section 21 applies the predetermined voltage to the drive line D as the control signal, the polarizing liquid crystal panel 23 generates the phase difference of a half wavelength in the direction of its own thickness. The control section 21 applies the predetermined voltage to the drive line D of the polarizing liquid crystal panel 23 as the control signal at the timing at which the outgoing light emitted by the projector PJ is switched from the outgoing light L1R of the right-eye image to the outgoing light L1L of the left-eye image. Thus, the polarizing liquid crystal panel 23 generates the phase difference of a half wavelength in the direction of its own thickness as shown in the upper part of FIG. 4B. Further, the control section 21 stops applying the predetermined voltage to the drive line D of the polarizing liquid crystal panel 23 as the control signal at the timing at which the outgoing light emitted by the projector PJ is switched from the outgoing light L1L of the left-eye image to the outgoing light L1R of the right-eye image. Thus, the polarizing liquid crystal panel 23 stops generating the phase difference of a half wavelength in the direction of its own thickness, namely gets into the state of 0 phase difference, as shown in the upper part of FIG. 4B.

Incidentally, the configuration and the action of the polarizing liquid crystal panel 23 in the case of adopting the line sequential drive system described above for the projector PJ. In this case, the polarizing liquid crystal panel 23 is provided with a pair of substrates and the liquid crystal sandwiched between the substrates, and has a configuration having n (n=4 in the present embodiment) liquid crystal units (pixel areas) each having a plurality of pixels arranged in a matrix, each of the pixels providing the light transmitted therethrough with a phase difference, which can be controlled in accordance with the control signal from the control section 21. Further, in the light transmission region of the polarizing liquid crystal panel 23, there is provided four drive lines.

As shown in FIG. 5A, the control section 21 has a configuration of applying predetermined voltages to the four drive lines as control signals. Then, if the control section 21 applies the predetermined voltages to the drive lines as the control signals, each of the liquid crystal units (each of the pixel areas) in the polarizing liquid crystal panel 23 generates the phase difference of a half wavelength in the direction of its own thickness. It should be noted that in the case in which the drive of the scan lines of the liquid crystal light valve in the projector PJ is scanned from the upper side to the lower side in the vertical direction of the liquid crystal panel in a line-sequential manner as shown in the upper part of FIG. 5B, the first liquid crystal unit through the fourth liquid crystal unit are driven as described below. Specifically, the image projected on the screen and the image displayed on each of the liquid crystal valves are vertically and horizontally flipped from each other by the projection lens system 1114. Therefore, the first through fourth liquid crystal units are driven sequentially from the lower side to the upper side in the vertical direction of the liquid crystal panel in an opposite manner to the case of the liquid crystal light valves.

Specifically, the control section 21 applies the predetermined voltages to the drive lines (referred to as the drive line D1 through the drive line D4) of the respective liquid crystal units of the polarizing liquid crystal panel 23 as the control signals in the following manner at the timing at which the outgoing light emitted by the projector PJ is switched from the outgoing light L1R of the right-eye image to the outgoing light L1L of the left-eye image.

The period T1 of the outgoing light L1R of the right-eye image and the period T2 (the predetermined period) of the outgoing light L1L of the left-eye image are equal to the period of one frame including the right-eye image data and the left-eye image data corresponding to one image. The control section 21 sequentially applies the predetermined voltages to the drive line D4, the drive line D3, the drive line D2, and the drive line D1 as the control signals in sync with the beginning time point of every two intervals in the period from the beginning time point of the second interval to the beginning time point of the (n×2)-th interval, the intervals being defined by dividing the predetermined period T2 of the left-eye image data into (n×4) intervals. Thus, the liquid crystal units in the polarizing liquid crystal panel 23 sequentially generates the phase difference of a half wavelength in the direction of its own thickness at the respective timings shifted $\frac{1}{16}$, $\frac{3}{16}$, $\frac{5}{16}$, and $\frac{7}{16}$ multiplied by the predetermined period T2 of the left-eye image data from the timing of switching from the outgoing light L1R of the right-eye image to the outgoing light L1L of the left-eye image.

Further, the control section 21 stops applying the predetermined voltages to the drive line D4, the drive line D3, the drive line D2, and the drive line D1 as the control signals in sync with the beginning time point of every two intervals in the period from the beginning of the second interval to the beginning time point of the (n×2)-th interval, the intervals being defined by dividing the predetermined period T1 of the right-eye image data into (n×4) intervals. Thus, the liquid crystal units in the polarizing liquid crystal panel 23 stops generating the phase difference of a half wavelength in the direction of its own thickness, namely gets into the state of 0 phase difference, at the respective timings shifted 1/16, 3/16, 5/16, and 7/16 multiplied by the predetermined period T1 of the right-eye image data from the timing of switching from the outgoing light L1L of the left-eye image to the outgoing light L1R of the right-eye image.

As described above, in the case in which, for example, each of the liquid crystal light valves in the projector PJ alternately displays (one frame corresponds to 16.6 millisecond) the right and left pictures at 120 Hz (8.3 millisecond) using the line sequential drive, the first through fourth liquid crystal units of the polarizing liquid crystal panel 23 are driven in the following manner.

Specifically, each of the pixels in each of the first through fourth liquid crystal units of the polarizing liquid crystal panel 23 is driven with the timing shifted by 2.1 millisecond (=16.6/8 millisecond). As described above, the drive of each of the pixels in each of the first through fourth liquid crystal units of the polarizing liquid crystal panel 23 is optimized by being synchronized with the timing at which the position of the boundary section between the right-eye image and the left-eye image in the sequential drive of the scan lines of the liquid crystal light valve inside the projector PJ is located at 1/8, 3/8, 5/8, and 7/8 in the vertical direction (the sequential direction) of the liquid crystal light valve. Thus, the phenomenon that the right-eye image enters the left eye or the left-eye image enters the right eye, which occurs in the transition of either one of the right-eye image and the left-eye image to the other, namely so-called crosstalk can be minimized.

Then, FIGS. 6A and 6B are diagrams for explaining the action of the image display system 10. FIG. 6A shows the intensity with respect to the wavelength of the outgoing light in each of the narrowband waveplate 22, the polarizing liquid crystal panel 23, and the polarization plate 24 in the case in which the projector PJ emits the outgoing light L1R of the right-eye image. Further, FIG. 6B shows the intensity with respect to the wavelength of the outgoing light in each of the narrowband waveplate 22, the polarizing liquid crystal panel 23, and the polarization plate 24 in the case in which the projector PJ emits the outgoing light L1L of the left-eye image. It should be noted that in FIGS. 6A and 6B, the vertically polarized light is shown as a V wave, and the horizontally polarized light is shown as an H wave.

The projector PJ is supplied with the right-eye image data and the left-eye image data from an external device (not shown in FIGS. 6A and 6B) respectively in the period T1 and the period T2 alternately in a time-divisional manner. Here, the right-eye image data includes right side identification information for identifying the right-eye image data, and the left-eye image data includes left side identification information for identifying the left-eye image data. Thus, in the projector PJ, the liquid crystal drive section 1130 performs the frame sequential drive or the line sequential drive on each of the liquid crystal light valves based on the right-eye image data, and the projector PJ emits the right-eye image data as the outgoing light L1R of the right-eye image in the predetermined period T1. Further, in the projector PJ, the liquid crystal drive section 1130 performs the frame sequential drive or the line sequential drive on each of the liquid crystal light valves based on the left-eye image data, and the projector PJ emits the left-eye image data as the outgoing light L1L of the left-eye image in the predetermined period T2.

As shown in FIG. 6A, when the projector PJ is supplied with the right-eye image data, the projector PJ emits the outgoing light L1R of the right-eye image. Further, when the right-eye image data is supplied, the control section 21 detects the fact that the timing of switching the outgoing light of the projector PJ from the outgoing light L1L of the left-eye image to the outgoing light L1R of the right-eye image is reached. Thus, the control section 21 starts stopping the application of the voltage as the control signal to the polarizing liquid crystal panel 23 in sync with the timing of switching from the outgoing light L1L of the left-eye image to the outgoing light L1R of the right-eye image in accordance with the drive system of the projector PJ.

The narrowband waveplate 22 converts the polarization state of the specific wavelength band of the outgoing light L1R of the right-eye image input therein, and then emits the result as the outgoing light L3. Here, as described above, the outgoing light L3 includes outgoing light L31 (the blue light LBD, the green light LGD, and the red light LRD) as the vertically polarized light, and outgoing light L32 (the blue light LBU, the green light LGU, and the red light LRU) as the horizontally polarized light.

The polarizing liquid crystal panel 23 emits the outgoing light L3 (the incident light input thereto) of the narrowband waveplate 22 without changing the polarization direction of the outgoing light L31 (the first outgoing light) as the vertically polarized light and the outgoing light L32 (the second outgoing light) as the horizontally polarized light, respectively. In other words, the polarizing liquid crystal panel 23 transmits the outgoing light L3 of the narrowband waveplate 22 without change.

The polarization plate 24 has the absorption axis in the same polarization direction as that of the horizontally polarized light (the second polarized light), and emits the vertically polarized light (the first polarized light), which has been input from the polarizing liquid crystal panel 23, as the outgoing light L2. Therefore, since the polarizing liquid crystal panel 23 emits the outgoing light L3, the polarization plate 24 transmits the outgoing light L31 as the vertically polarized light, and absorbs the outgoing light L32 as the horizontally polarized light without reflection. In other words, the wavelength separation device 20 emits the light having the wavelength in the first wavelength band as outgoing light L2R out of the outgoing light L1R, which is the outgoing light of the right-eye image emitted by the projector PJ.

On the other hand, as shown in FIG. 6B, when the projector PJ is supplied with the left-eye image data, the projector PJ emits the outgoing light L1L of the left-eye image. Further, when the left-eye image data is supplied, the control section 21 detects the fact that the timing of switching the outgoing light of the projector PJ from the outgoing light L1R of the right-eye image to the outgoing light L1L of the left-eye image is reached. Thus, the control section 21 starts applying the voltage as the control signal to the polarizing liquid crystal panel 23 in sync with the timing of switching from the outgoing light L1R of the right-eye image to the outgoing light L1L of the left-eye image in accordance with the drive system of the projector PJ.

The narrowband waveplate 22 converts the polarization state of the specific wavelength band of the outgoing light L1L of the left-eye image input therein, and then emits the result as the outgoing light L3.

The polarizing liquid crystal panel 23 emits the outgoing light L31' obtained by changing the polarization direction of the outgoing light L31 as the vertically polarized light to the horizontally polarized light in the outgoing light L3 of the narrowband waveplate 22, and the outgoing light L32' obtained by changing the polarization direction of the outgoing light L32 as the horizontally polarized light to the vertically polarized light, respectively. In other words, the polarizing liquid crystal panel 23 rotates the polarization axis of the outgoing light L3 of the narrowband waveplate 22 by 90°, and then outputs it as the outgoing light L3'.

The polarization plate 24 transmits the outgoing light L32' as the vertically polarized light, and absorbs the outgoing light L31' as the horizontally polarized light without reflection out of the outgoing light L3' from the polarizing liquid crystal panel 23. In other words, the wavelength separation device 20 emits the light having the wavelength in the second wavelength band as the outgoing light L2L as the vertically polarized light out of the outgoing light L1L, which is the outgoing light of the left-eye image emitted by the projector PJ.

As described above, since the wavelength separation device 20 according to the embodiment of the invention is composed of the narrowband waveplate 22, the polarizing liquid crystal panel 23, and the polarization plate 24, the wavelength separation can be achieved without using the rotating wheel in the image display system using the wavelength separation system. Further, the wavelength separation device 20 according to the embodiment of the invention converts the outgoing light L1R (the image light of the right-eye image) of the right-eye image and the outgoing light L1L (the image light of the left-eye image) of the left-eye image, which are the light emitted from the projector PJ (the image display device) constituting the image display system 10, into the light which can be separated by the narrowband waveplate 22 (the waveplate) into the outgoing light L31 (the first outgoing light) and the outgoing light L32 (the second outgoing light) in accordance with the polarization direction. The polarizing liquid crystal panel 23 (the polarization control element) to which the first outgoing light and the second outgoing light are input emits the first outgoing light and the second outgoing light with the polarization direction converted or without converting the polarization direction in sync with the timing at which the light emitted from the projector PJ is switched between the outgoing light L1R of the right-eye image and the outgoing light L1L of the left-eye image. The polarization plate 24 (the polarization plate) has the absorption axis in the same polarization direction as the horizontally polarized light, and therefore, absorbs the horizontally polarized light not transmitted therethrough without reflecting it toward the projector PJ. Thus, it is possible to provide the wavelength separation device 20, which does not reflect the light toward the projector PJ constituting the image display system 10, and thus, it is possible to improve the quality of the display screen in the image display system 10.

Although the embodiment of the invention is hereinabove described in detail with reference to the accompanying drawings, the specific configuration is not limited to the embodiment described above, but the design and so on within the scope or the spirit of the invention are also included therein.

Further, in the outgoing light L1 of the projector PJ, all of the red light LR, the green light LG, and the blue light LB (RGB) may be either one of the vertically polarized light and the horizontally polarized light.

Further, although it is also possible to divide the wavelength of the light into two or more wavelength bands in the wavelength separation system, it is required to make the transmission characteristics of the pair of observation spectacles 30 and the phase difference characteristics (the presence or absence of the phase difference) of the narrowband waveplate 22 have the corresponding spectrum characteristics in accordance therewith. Further, in the transmission characteristics of the pair of observation spectacles 30, it is not required to arrange the transmission wavelength band of the right-eye image and the transmission wavelength band of the left-eye image alternately with respect to the wavelength $\lambda$, but it is sufficient that the wavelength band of each of the colored lights is divided. For example, in the transmission characteristics of the pair of observation spectacles 30, it is also possible to arrange the transmission wavelength band for the right-eye image, the transmission wavelength band for the left-eye image, the transmission wavelength band for the left-eye image, the transmission wavelength band for the right-eye image, the transmission wavelength band for the left-eye image, and the transmission wavelength band for the right-eye image, in this order from the side with a smaller value of the wavelength $\lambda$.

Further, although the polarization plate 24 of the wavelength separation device 20 can be arranged to be the polarization plate having the absorption axis in the same polarization direction as the first polarized light, it is necessary to arrange that the polarizing liquid crystal panel 23 generates the phase difference of a half wavelength in the direction of its own thickness in sync with the timing of switching from the outgoing light L1L of the left-eye image to the outgoing light L1R of the right-eye image, and the polarizing liquid crystal panel 23 gets into the state of 0 phase difference in the direction of its own thickness in sync with the timing of switching from the outgoing light L1R of the right-eye image to the outgoing light L1L of the left-eye image in accordance with the modification.

The entire disclosure of Japanese Patent Application No. 2012-057234, filed Mar. 14, 2012 is expressly incorporated by reference herein.

What is claimed is:

1. A wavelength separation device comprising:
a waveplate to which image light of a right-eye image and image light of a left-eye image are input from an external device in a time-divisional manner, and adapted to convert a polarization direction of light in a predetermined wavelength band so that the image light of the right-eye image input and the image light of the left-eye image input can be separated into first outgoing light having a first wavelength band, and having a polarization direction of first polarized light and second outgoing light having a second wavelength band, and having a polarization direction of second polarized light different from the polarization direction of the first polarized light, and then emit the light;
a polarization control element adapted to respectively emit the first outgoing light and the second outgoing light input through the waveplate without changing polarization directions of the first outgoing light and the second outgoing light in a case of either one of the image light of the right-eye image and the image light of the left-eye image, and respectively emit the first outgoing light and the second outgoing light after changing the polarization direction of the first outgoing light to the polarization direction of the second polarized light and changing the polarization direction of the second outgoing light to the polarization direction of the first polarized light in a case of the other of the image light of the right-eye image and the image light of the left-eye image; and
a polarization plate having an absorption axis in one of the polarization directions of the first polarized light and the second polarized light, and transmitting and then emitting light having the other of the polarization directions.

2. A projector comprising:
the wavelength separation device according to claim 1 to which the image light of the right-eye image and the image light of the left-eye image are input; and an image display device adapted to emit the image light of the right-eye image and the image light of the left-eye image to the wavelength separation device.

3. The projector according to claim 2, further comprising:
a control section adapted to perform switching of the polarization direction of the light in a pixel area of the polarization control element in sync with a beginning time point of a predetermined period with which a liquid crystal panel provided to the image display device is driven using a frame sequential drive system of driving scan lines in a lump.

4. The projector according to claim 2, further comprising:
a plurality of pixel areas disposed in the polarization control element; and
a control section adapted to perform driving of switching between a state of keeping the polarization direction and a state of changing the polarization direction for each of the pixel areas of the polarization control element in accordance with sequential drive of scan lines of a liquid crystal panel provided to the image display device in a case in which the image display device drives the liquid crystal panel with a predetermined period using a line sequential drive system of sequentially driving the scan lines.

5. An image display system comprising:
the projector according to claim 2; and
a pair of spectacles having a right-eye side and a left-eye side, either one of which has a transmission property of transmitting the light in the first wavelength band, and the other of which has a transmission property of transmitting the light in the second wavelength band.

6. An image display system comprising:
the projector according to claim 3; and
a pair of spectacles having a right-eye side and a left-eye side, either one of which has a transmission property of transmitting the light in the first wavelength band, and the other of which has a transmission property of transmitting the light in the second wavelength band.

7. An image display system comprising:
the projector according to claim 4; and
a pair of spectacles having a right-eye side and a left-eye side, either one of which has a transmission property of transmitting the light in the first wavelength band, and the other of which has a transmission property of transmitting the light in the second wavelength band.

* * * * *